(12) United States Patent
Hobbs et al.

(10) Patent No.: US 9,426,974 B2
(45) Date of Patent: Aug. 30, 2016

(54) DEVICE AND METHOD FOR WEED CONTROL

(75) Inventors: Richard Hobbs, St. Neots (GB); Jason Morehen, St. Neots (GB); Malcolm Myers, St. Neots (GB)

(73) Assignee: Weeding Technologies Limited (GB)

( * ) Notice: Subject to any disclaimer, the term of this patent is extended or adjusted under 35 U.S.C. 154(b) by 454 days.

(21) Appl. No.: 13/884,131

(22) PCT Filed: Nov. 8, 2011

(86) PCT No.: PCT/GB2011/052167
§ 371 (c)(1),
(2), (4) Date: Dec. 23, 2013

(87) PCT Pub. No.: WO2012/063057
PCT Pub. Date: May 18, 2012

(65) Prior Publication Data
US 2014/0096443 A1    Apr. 10, 2014

(30) Foreign Application Priority Data

Nov. 9, 2010 (GB) .................................... 1018912.4
Jul. 28, 2011 (GB) .................................... 1112955.8

(51) Int. Cl.
*A01M 21/04* (2006.01)

(52) U.S. Cl.
CPC ........... *A01M 21/043* (2013.01); *A01M 21/04* (2013.01)

(58) Field of Classification Search
CPC ............................ A01M 21/043; A01M 21/04
USPC .................................... 47/1.5, 1.44; 111/7.2
See application file for complete search history.

(56) References Cited

U.S. PATENT DOCUMENTS

| 2,117,419 A | * | 5/1938 | Hamrick et al. .............. 392/403 |
| 2,987,259 A | * | 6/1961 | Lindquist ................ B08B 3/026 122/250 R |
| 3,226,030 A | * | 12/1965 | Rossi ...................... B60S 3/044 159/4.01 |
| 3,814,321 A | * | 6/1974 | Mulholland ............ F24H 1/165 222/146.1 |
| 3,997,114 A | * | 12/1976 | Hewett ................... B08B 3/026 239/127 |
| 4,222,521 A | * | 9/1980 | Nielsen ................... B08B 3/026 137/588 |

(Continued)

FOREIGN PATENT DOCUMENTS

DE   20 2009 001969 U1   5/2009
EP             0920802 A1   9/1999

(Continued)

OTHER PUBLICATIONS

International Search Report and Written Opinion for International Application No. PCT/GB2011/052167 dated Feb. 27, 2012.

(Continued)

*Primary Examiner* — Kristen C Hayes
*Assistant Examiner* — Ebony Evans
(74) *Attorney, Agent, or Firm* — Tumey L.L.P.

(57) ABSTRACT

An apparatus suitable for controlling unwanted vegetation which apparatus comprises a reservoir (2), release means (6) connected to the reservoir (2), and a nozzle (10) for applying a stream of foam including steam, connected to the reservoir (2) through the release means (6). A liquid is heated in the reservoir (2) to an elevated pressure, the liquid comprising water and a surfactant, i.e. a foaming agent, and forms a foam when discharged through the nozzle (10). The foam contains steam, and is effective at killing the foliage.

21 Claims, 6 Drawing Sheets

(56) References Cited

U.S. PATENT DOCUMENTS

| | | | | |
|---|---|---|---|---|
| 4,578,895 | A | * | 4/1986 | Baumber .................. 47/1.5 |
| 5,213,263 | A | | 5/1993 | Corona |
| 5,385,106 | A | * | 1/1995 | Langshaw .................. 111/127 |
| 5,575,111 | A | * | 11/1996 | Rajamannan ............ 47/58.1 R |
| 5,622,123 | A | | 4/1997 | Rajamannan |
| 6,029,589 | A | * | 2/2000 | Simpson .................. 111/7.2 |
| 6,164,557 | A | * | 12/2000 | Larson .................. B05B 7/168 239/127 |
| 7,190,890 | B2 | * | 3/2007 | Higham ............ A01M 1/2094 392/465 |
| 2005/0005509 | A1 | * | 1/2005 | Tindall et al. .......... 47/1.01 R |
| 2005/0116071 | A1 | | 6/2005 | Rajamannan |
| 2005/0223638 | A1 | * | 10/2005 | Moren .................. 47/58.1 R |
| 2007/0227418 | A1 | | 10/2007 | Polfer |
| 2008/0190016 | A1 | * | 8/2008 | Burton .................. 47/1.5 |
| 2014/0103138 | A1 | * | 4/2014 | Hobbs ............... A01M 7/0042 239/130 |
| 2016/0044909 | A1 | * | 2/2016 | Lampe ............... A01M 21/043 47/1.5 |

FOREIGN PATENT DOCUMENTS

| | | |
|---|---|---|
| EP | 1772397 A2 | 4/2007 |
| GB | 2273430 A | 6/1994 |
| GB | 2332849 A | 7/1999 |
| JP | 2011015661 A | 7/2009 |
| NZ | 237524 A | 4/1995 |
| WO | WO 02/07513 A1 | 1/2002 |
| WO | WO 03/026414 A1 | 4/2003 |

OTHER PUBLICATIONS

Great Britain Search Report for Great Britain Application No. GB 1112956.6 dated Nov. 28, 2011.
English Translation of Denmark Abstract for Denmark Application No. DK173373 B1 dated Jul. 8, 1999.
Great Britain Search Report for Great Britain Application No. GB 1119235.8 dated Mar. 8, 2012.
Great Britain Search Report for Great Britain Application No. GB 1112955.8 dated Nov. 28, 2011.
Great Britain Search Report for Great Britain Application No. GB 1018912.4 dated Mar. 9, 2011.

* cited by examiner

DEVICE AND METHOD FOR WEED CONTROL

The present invention relates to a method of controlling vegetation and to an apparatus for performing the method.

Conventionally, vegetation, such as weeds, is typically controlled either by physical removal, such as hand weeding, or by the use of herbicides. Hand weeding can be very hard work. Plants are becoming increasingly resistant to herbicides. In addition, there is increasing public resistance to the use of chemicals in the environment and legislative changes to reduce the use of toxic chemicals as herbicides. Therefore, there is an interest in methods of controlling vegetation which do not use synthetic chemicals and avoid hand weeding.

Thermal methods have been suggested for weed control. A variety of methods have been used to provide heat to weeds, for example, hot water, steam, hot air, flames and hot foam. These methods can overcome some of the disadvantages of herbicides such as spray drift and soil or groundwater pollution. EP 1 450 603 discloses a method of controlling vegetation including preparing a foam having a temperature of between 75° C. and 100° C. and consisting volumetrically of 60 to 75% aqueous solution of biodegradable foaming agent and 40 to 25% air and directing a stream of foam on the vegetation.

The present invention seeks to provide a mobile apparatus for use in controlling vegetation and in particular a portable apparatus for use in a domestic situation.

The present invention provides a mobile apparatus suitable for controlling vegetation which apparatus comprises a reservoir, release means connected to the reservoir, and a nozzle for applying a stream of foam and steam, connected to the reservoir through the release means, and a heating means connectable to mains power, wherein the reservoir is suitable for the steam pressure in the reservoir to be above atmospheric pressure.

The vegetation to be controlled typically comprises weeds.

In this document the term 'mobile' encompasses both an apparatus which can be carried by an operator, or an apparatus which can be propelled by an operator. Hence, the apparatus may be of a size to be carried by the operator. Alternatively, the apparatus may be mounted on a wheeled trolley which may have one or more wheels, preferably two or more. In a preferred embodiment the apparatus is untethered in use, that is, it is not connected to mains power while foam is being sprayed.

The reservoir is preferably a container which can maintain a liquid at a temperature of from 96° C. to 105° C. for about 20 minutes, for example from 10 to 30 minutes, preferably 15 to 25 minutes, more preferably for 20 to 25 minutes.

The reservoir may be a reservoir which is insulated or it may be a simple reservoir constructed from an insulating material such as plastic. For example, it may be a container made of metal, e.g. aluminium or stainless steel, or plastic that is surrounded by an insulator such as insulating foam, or it may be a plastic container which is itself insulating, or it may be a double walled container where the two walls are separated by an air gap or a vacuum gap. A double walled container may be made of, for example, metal or plastic. In a preferred embodiment the reservoir is constructed from stainless steel. In a particularly preferred embodiment the reservoir is constructed from a metal such as stainless steel and surrounded by an insulator such as a thermal blanket.

The reservoir is a reservoir which comprises a heating means and the heating means is connected to a power source such as the mains electricity or a battery. The heating means is typically a heating element such as an immersion heater. The apparatus comprises an input for mains power and a heating element suitable for connection to mains power. In a further embodiment, the apparatus may comprise a further heating element and a battery connectable to the heating element. In an alternative embodiment the apparatus may be filled with hot liquid which is heated using mains power. In a preferred embodiment the reservoir comprises two heating elements: a heating element that may be connected to the mains electricity and a heating element that may be connected to a battery. Preferably the battery is a lithium ion battery, or a nickel-cadmium battery. A suitable battery for a portable apparatus that can be carried would be a 36 V 2600 mAh battery.

The reservoir of the wheeled trolley apparatus is preferably a container which can maintain a liquid at a temperature of from 96° C. to 105° C. for up to an hour without using mains or vehicle power. The reservoir is typically either insulated or kept at temperature using battery power.

The reservoir for the apparatus which can be carried by its operator typically can hold a volume of liquid of up to 5 liters, preferably from 0.2 to 4 liters, preferably from 0.5 to 3 liters, more preferably from 0.75 to 1.5 liters, most preferably about 1 liter. The reservoir for a wheeled trolley mounted apparatus typically can hold a volume of liquid of up to 30 liters, preferably from 5 to 25 liters, more preferably from 10 to 20 liters.

The liquid used in the reservoir is typically water combined with a surfactant, which acts as a foaming agent. The surfactant is typically used at a concentration of up to 2.5%, preferably 0.05 to 2%, more preferably from 0.2% to 1.5%, more preferably about 0.5% or 1.0%. The surfactant may be organic or inorganic. The surfactant is preferably a biodegradable foaming agent such as alkyl polyglycoside and is preferably a natural product.

The release means is, for example, a valve which allows liquid to exit from the reservoir when open. In one embodiment, the valve allows a limited pressure to build up in the reservoir so as to cause the liquid to exit from the nozzle when the valve is released. In a further embodiment, where the apparatus comprises a heating element powered by a battery, the valve may be connected such that when the valve is opened, the battery circuit is switched on so that the battery provides power to heat the liquid so as to produce more steam and restore the pressure in the reservoir to the level achieved before the valve was opened. In another embodiment the release means may be powered by the battery and may be connected such that the release means can only be opened when mains power is disconnected. The release means may be operated by a trigger mechanism that is safety interlocked. The battery may be connected in a circuit that comprises a pressure sensor to prevent the pressure from becoming too high in the reservoir.

The release means may be connected to the reservoir at the bottom, side or top of the reservoir. In a preferred embodiment the release means is connected to the bottom of the reservoir.

The reservoir may be provided with a further opening through which the reservoir is filled.

The reservoir may also have a further opening for the surfactant. This may be, for example, a bottle of surfactant with a drip feed or it may be a 'tablet holder', an opening into the reservoir where a grid separates the surfactant from the main section of the reservoir. In this embodiment a tablet could be placed on the grid and the cap closed. Water is then added to the reservoir and heated, which causes the tablet to dissolve through the grid and mix into the liquid in the reservoir. Alternatively, the surfactant may be added to the reservoir as a capsule.

The nozzle may have a single hole. The nozzle is typically a directional nozzle so that the hot foam produced by the apparatus can be directed accurately onto vegetation. Alternatively the apparatus may be provided with interchangeable nozzles to enable cleaning of the apparatus and in order to change nozzle geometry easily. In another embodiment, a nozzle with variable geometry may be provided such as a nozzle that can provide either a jet or a mist of foam. The nozzle may have multiple openings which enables foam to be directed at several points around the base of a weed simultaneously.

Where the nozzle has a single hole, the hole in the nozzle is typically up to 2 mm in diameter for the apparatus that can be carried by the operator, more preferably up to 1 mm, more preferably up to 0.8 mm or 0.6 mm. However, the size of the nozzle hole also depends on the configuration of the apparatus. Where the nozzle is connected to the reservoir through an opening at the bottom or low down in the reservoir then a smaller hole can be used than where the nozzle is connected to the reservoir through an opening at the top of the reservoir. The reservoir is connected to the nozzle by a tube or duct, and this tube may define a larger-diameter chamber before the nozzle; alternatively or additionally the tube may define a venturi section with an air inlet, so that ambient air is mixed with the liquid before it emerges through the nozzle. Where there is a larger-diameter chamber immediately before the nozzle, the chamber may contain turbulence-enhancing features; for example such a chamber may contain a mesh or a compressed wire wool tablet.

The apparatus may further comprise a shroud for the nozzle. Thus the nozzle may be mounted within or inside a shroud or may be enclosed on one side by a shroud. The nozzle and shroud may be a single item or may be made of separate components. Where the nozzle and shroud comprise separate components the shroud may be removable from the apparatus. The shroud may be of a size so as to cover a small weed, thus creating a steam/foam chamber.

The reservoir may be mounted on a support. The support typically comprises a grip for holding or moving the apparatus. The grip is advantageously shaped so as to fit well in the hand of the operator. The apparatus may also be provided with a shoulder strap or an alternative strap or harness for attaching the apparatus to the operator. This is particularly desirable where the apparatus is of the type to be carried by the operator.

In a preferred embodiment the overall weight of the portable apparatus of the type that can be carried by the operator, when the reservoir is empty, is from 2 to 5 kg, preferably from 3 to 4 kg, more preferably about 3.5 kg.

In a further embodiment the reservoir is removable from the apparatus and can be heated by mains power when removed from the apparatus, for example by being placed on a suitable base in a similar manner to a cordless electric kettle. This is particularly useful for the portable apparatus of the type that can be carried by the operator In another embodiment, the reservoir remains attached to the apparatus. The apparatus may comprise a cordless kettle type connection for mains power to heat the water; the apparatus may comprise a simple docking arrangement so it can be hung on the wall while this takes place, or the apparatus may plug into a docking station (as described below) which provides power and optionally charges the battery. The apparatus may be placed on a worktop or stand on the floor while the battery is charged.

Where the apparatus comprises a battery then the battery can be charged when the apparatus is connected to mains power. In the embodiment where the reservoir is removed from the apparatus to heat the liquid then the battery can be charged while heating the liquid if the battery remains connected to the reservoir as the liquid is heated. Where the battery is disconnected from the reservoir when the reservoir is removed then a separate charger is provided for the battery. Thus, the apparatus may comprise one or more mains connections with one connection for heating the liquid in the reservoir and one connection for charging the battery. These may be incorporated into a single connector if both are present.

Where the apparatus comprises one or more heating elements then each heating element is typically connected to a capillary thermostat or a thermocouple which is used to turn the heater off when the liquid reaches the required temperature. As an alternative, the apparatus may comprise a bimetallic switch; such a switch may be connected to the outside of the reservoir where the reservoir is made of metal. When the reservoir reaches the required temperature, say 105° C., the bimetallic switch breaks the power connection to the heating element. As a further feature the heating element may be connected to a thermal fuse, which breaks the circuit at a significantly higher temperature, such as 120° C.; this would act as a safety device if the bimetallic switch or thermocouple-actuated switch has failed to break the connection. The reservoir may also be fitted with a steam overpressure valve which would vent steam to outside the tank in the event of a failure of any part of the heating system that resulted in excess steam pressure within the reservoir.

The apparatus preferably comprises a steam pressure gauge and feedback loop connected to measure the steam pressure in the reservoir. When the apparatus is connected to mains or battery power, the relevant heating element heats the water until the steam pressure in the reservoir is above atmospheric pressure and then the feedback loop shuts off the power. For an apparatus comprising a battery, the steam pressure gauge and feedback loop maintain the liquid at boiling point and the steam pressure at a preset desired value above atmospheric as the liquid is used.

In one embodiment the apparatus may further comprise a docking station which docking station provides means for connecting mains power to the apparatus to heat the liquid in the reservoir and if required, connecting means to charge the battery. The docking station may comprise a support structure for holding the apparatus of the present invention especially if the apparatus is portable of the type carried by an operator. The docking station may be wall mounted. In a preferred embodiment the docking station provides a mains power connector and a support.

In a particularly preferred embodiment, the apparatus is a portable apparatus and comprises a reservoir, release means connected to the reservoir and a nozzle for applying a stream of foam to vegetation connected to the reservoir through the release means and a heating means, wherein the heating means is connectable to mains power and the release means is connected at the bottom of the reservoir. The release means is preferably a valve and it is connected at the bottom of the reservoir when the reservoir is held in the operational position.

In a further embodiment, the apparatus of the present invention may be used to control pests such as pests on plants and/or pests on the ground. Pests on plants may include black fly and aphids. Pests on the ground may include woodlice, other pests with carapaces, slugs and snails. For the control of pests on the ground the apparatus described above may be used. However, for the control of pests on plants the apparatus is preferably modified so as to include a variable temperature control such that the water and surfactant is heated to a temperature of from 45 to 57° C., more preferably from 50 to 57° C.

The present invention also provides the use of an apparatus of the invention to control vegetation.

The present invention also provides a method of controlling vegetation which method comprises preparing a hot foam mixture comprising foaming agent, water and steam and directing the foam onto vegetation wherein the steam pressure in the apparatus remains above atmospheric pressure while the foam is used. In a preferred embodiment the hot foam mixture comprises up to 10% steam, more preferably up to 5% steam (these being proportions by weight).

The method may further comprise heating a liquid comprising water and a foaming agent to a temperature of from 96° C. to 105° C., preferably at least 102° C. The liquid may be heated using mains or battery power. In a preferred embodiment the liquid is heated initially using mains power and the mains power is disconnected before directing the foam onto vegetation. In addition, hot water may be provided to the reservoir before heating commences, for example from a domestic hot water tap.

In a preferred embodiment, the foaming agent and water are maintained at 96° C. to 105° C. using a battery powered heating element while the foam is directed onto the vegetation. In another embodiment, the foaming agent and water are maintained at 96° C. to 105° C. in an insulated reservoir.

In a preferred embodiment, the foam is released by a release means and the release means is battery powered. In a particularly preferred embodiment, the release means is configured such that the release means can only be used to release the foam when mains power is disconnected.

In a preferred embodiment the hot foam mixture further comprises a dye, and the foam is coloured or the residue left when the foam collapses is coloured.

As the liquid is heated to form steam, the steam forces the liquid out of the nozzle of the apparatus whenever the release means is opened. The liquid combines with air as it leaves the nozzle forming hot foam which typically contains steam. Air dissolved in the water also comes out of solution as the water is heated and assists in forming foam. As the temperature increases, the pressure in the reservoir rises. Typically a low pressure is used that is above atmospheric pressure, for example 120 kPa (18 psi) to 202 kPa (30 psi), or 120 kPa (18 psi) to 135 kPa (20 psi) (absolute pressures).

Foliage that is sprayed with the hot foam mixture typically wilts and dies within 1 day. This does depend on the type of plant and the amount of foam that contacts the plant. Plants that have a very waxy coating may require a larger amount of foam to impart sufficient heat to the plant. Some plants show a colour change within one hour. The ambient conditions also affect how fast the plant shows signs that it has been killed. For example, plants typically show signs of withering or colour change faster in the summer growing season in the UK than in the winter. However, the technique is still effective in the winter.

The method of the present invention may also be used to control pests. The present invention therefore provides a method of controlling pests which method comprises preparing a hot foam mixture comprising foaming agent and water and directing the foam onto pests. The method may further comprise heating a liquid comprising water and a foaming agent to a temperature of from 96° C. to 105° C., preferably at least 102° C. where the pests are on the ground. The method may further comprise heating a liquid comprising water and a foaming agent to a temperature of from 45 to 57° C., more preferably from 50 to 57° C. where the pests are on plants or on the ground.

The following illustrative examples relating to methods of operation and apparatus of the present invention are intended to illustrate typical methods of operation and typical apparatuses and are not intended to be limiting on the scope of the invention. The invention is also described with reference to the drawings, in which:

EXPERIMENTAL EXAMPLE

A domestic steaming device (purchasable from Argos) was modified to incorporate a nozzle of a defined diameter at the outlet. The steaming device has a reservoir with an outlet at the top of the reservoir. 5 ml of Atlox AL-2575 (from Croda) surfactant was dissolved in 300 ml tap water and placed in the steaming device. The device was switched on and the water boiled.

Using the trigger to release fluid through the nozzle, foam was produced and then steam was produced until no more fluid was ejected from the nozzle. While foam was produced from the nozzle, the foam was directed at a range of broad-leafed weeds as found in a domestic garden. Several nozzles sizes were trialled. The steamer was held upright while the trigger was depressed.

It was noticed that initially hot foam was ejected from the nozzle, but this eventually changed to an ejection of steam before the water supply eventually ran out. The amount of electricity used once the trigger was depressed was noted. This gave an estimate of the amount of energy required from the battery of a portable apparatus. The results were as shown in the Table below, where the nozzle size (mm) refers to the diameter of the nozzle hole and the energy (kWh) is the electric energy used, once the trigger was depressed, to maintain the temperature of the fluid while the foam and then steam was produced. The comment describes the jet of foam/steam. In the final example, the steamer was inverted so that the nozzle was below the water reservoir.

TABLE

| Nozzle size/mm | Foam Time | Steam Time | Energy/kWh | Comment |
| --- | --- | --- | --- | --- |
| 1.5 | 1 m 30 s | 0 m 27 s | 0.02 | Fierce |
| 1.3 | 1 m 38 s | 0 m 29 s | 0.01 | Strong |
| 1.1 | 1 m 57 s | 1 m 0 s | 0.02 | Strong |
| 0.9 | 2 m 33 s | 2 m 2 s | 0.03 | Strong |
| 0.7 | 2 m 0 s | 10 m | 0.07 | Moderate |
| Inverted steamer 1.1 | 48 s | 18 s | n/a | Fierce |

On average it took 3-5 seconds to scald each weed. Within an hour certain types of broad-leaved weed showed a colour change. There was no re-growth of the weeds after 14 days.

It should be noted that the 0.7 mm nozzle resulted in inconsistent foam production with this apparatus and surfactant. Also, it should be noted that the electricity meter used was able to give readings only with a resolution of 0.01 kWh and therefore the apparent inconsistency of the energy (in kWh) used for the 1.5, 1.3 and 1.1 mm nozzles may be due to rounding errors.

The Embodiments Of The Figures

Figure 1:
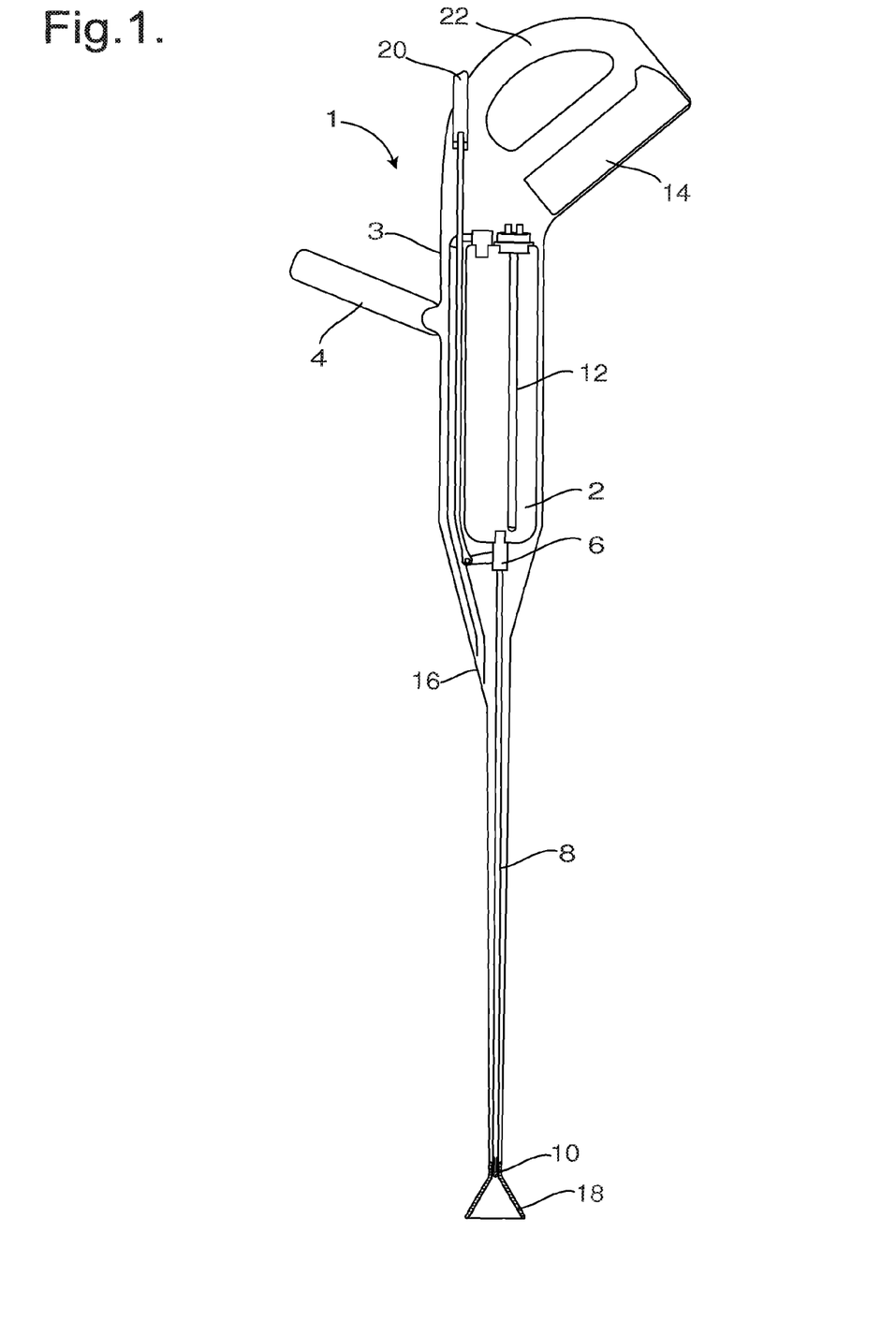
FIG. 1 shows a longitudinal cross-section through a portable apparatus of the present invention.

FIG. 1 shows a longitudinal cross-section through a portable apparatus of the present invention. The apparatus 1 has a reservoir 2 mounted within a casing 3 that is provided with a handle 4. The reservoir 2 has a valve 6 connected by a pipe 8, typically plastic, to a nozzle 10. The reservoir 2 is provided with an immersion heater 12 connected to a battery 14 (connections are not shown). The reservoir 2 also has a steam over-pressure outlet through which steam is vented from the reservoir in the event of a build up of excess pressure. The nozzle 10 is housed within a shroud 18 to direct the foam towards the vegetation. The apparatus also has a button 20 for releasing the valve 6.

Figure 2:
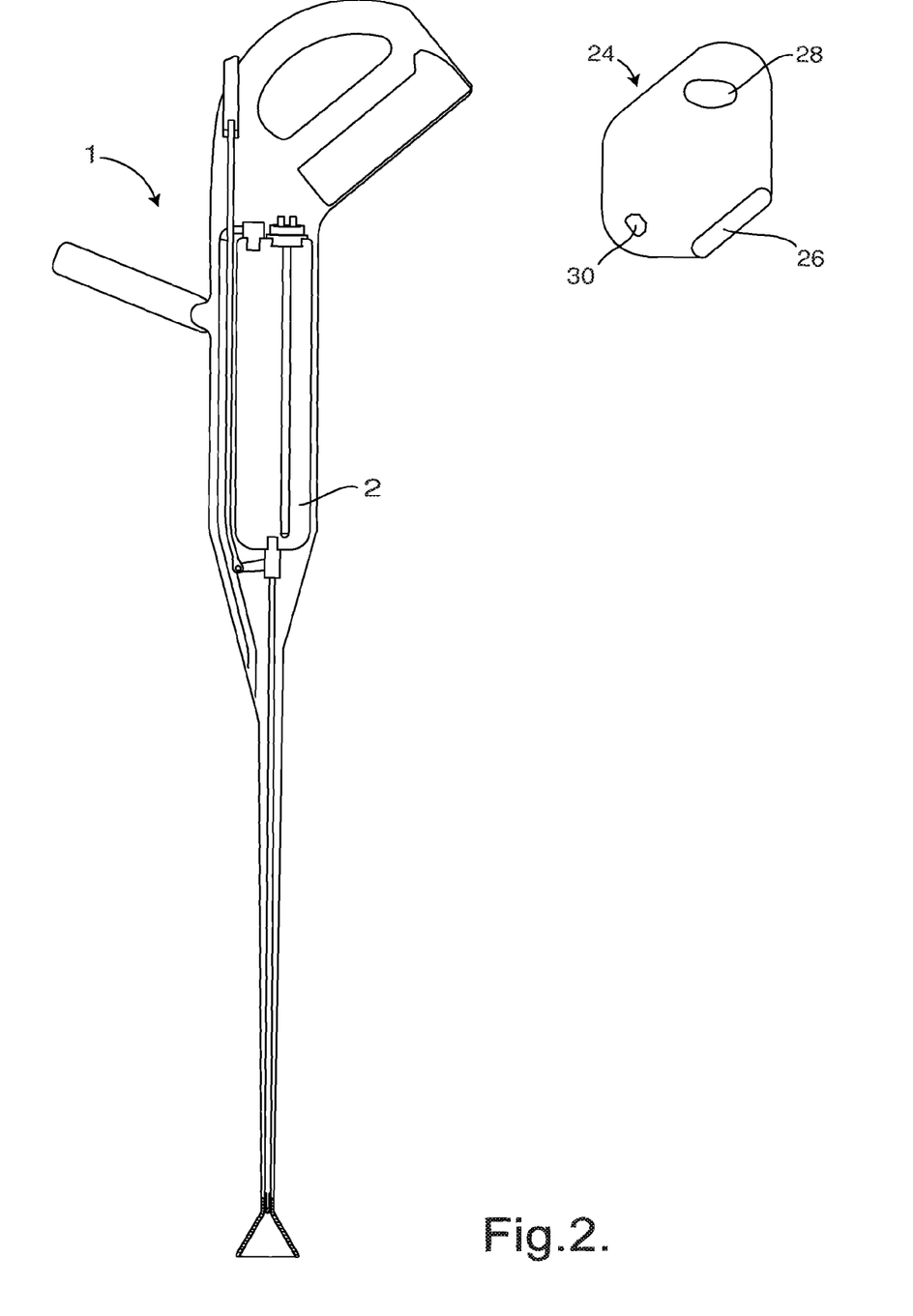
FIG. 2 shows the same longitudinal cross-section as FIG. 1 and in addition shows a side view of a docking station for the portable apparatus of FIG. 1.

FIG. 2 shows the same longitudinal cross-section through the portable apparatus 1 of FIG. 1, and in addition shows a side view of a docking station 24 for the portable apparatus 1. The apparatus 1 and docking station 24 are shown in the same orientation. The docking station 24 is, for example, mounted on a wall. The docking station 24 has a projecting rest 26 on which the apparatus 1 rests. The apparatus 1 is further secured on the docking station 24 by an additional support 28. The docking station 24 also includes a mains connector 30 which is used to provide power to heat the water in the reservoir 2 of the apparatus 1.

Figure 3A:
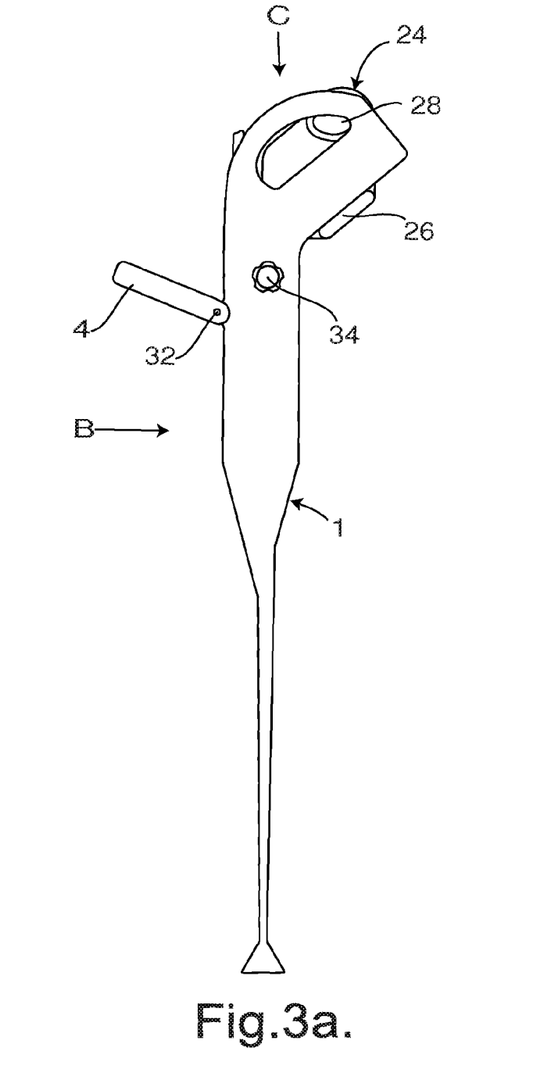
FIG. 3A shows a side view of the apparatus of FIGS. 1 and 2.
Figure 3B:
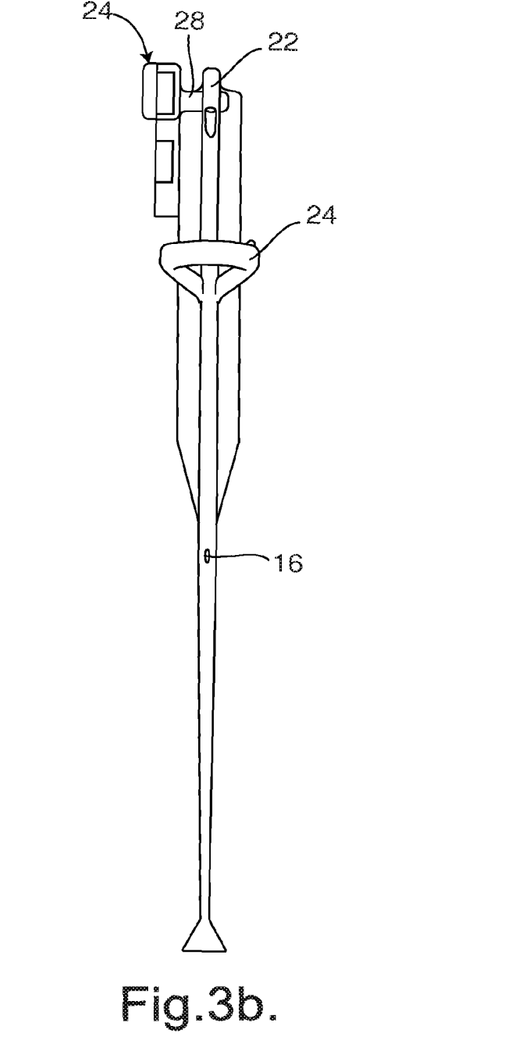
FIG. 3B shows a view of the apparatus 1 in the direction of arrow B of FIG. 3A.
Figure 3C:
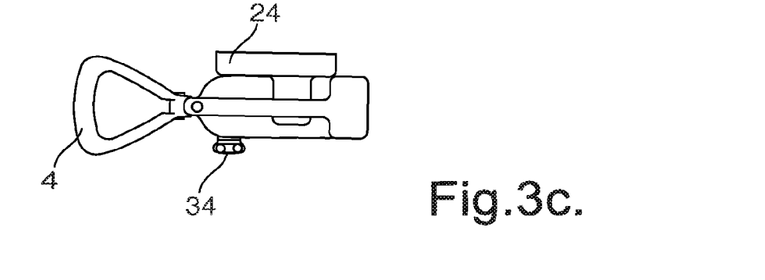
FIG. 3C shows a view of the apparatus in the direction of arrow C of FIG. 3A.

FIGS. 3a, 3b and 3c show three views of the portable apparatus 1 of FIGS. 1 and 2 in position on the docking station 24. FIG. 3a shows a side view of the apparatus 1 from the same direction as FIGS. 1 and 2. In FIG. 3a it can be seen that the handle 4 is adjustable using the pivot 32 by which it is connected to the casing 3. The apparatus rests on the supports 28 and 26. The apparatus 1 has a fill opening for the reservoir 2 (not shown) provided with a cap 34.

FIG. 3b shows a view of the apparatus 1 in the direction of arrow B of FIG. 3a. The docking station 24 supports the apparatus 1 on the support 28 at the grip 22 of the apparatus. The steam over-pressure outlet 16 can be seen further down on the apparatus 1.

FIG. 3c shows a view of the apparatus 1 in the direction of arrow C of FIG. 3a. This shows the handle 4, the docking station 24 supporting the apparatus 1, and the cap 34 for the reservoir.

In use the reservoir 2 is filled with a mixture of water and surfactant (which acts as a foaming agent) through the fill opening in the reservoir and then sealed with the cap 34. The apparatus 1 is then placed in the docking station 24 and connected via the mains connector 30 to mains power. The water in the reservoir 2 is heated using the mains power to boiling point. Once the water reaches the desired temperature, typically from 96 to 105° C., the mains power is disconnected by suitable circuitry, not shown. The apparatus 1 can then be removed from the docking station 24 for use on vegetation (and optionally pests).

In use, the operator carries the apparatus using the handle 4 and the grip section 22. When the operator approaches a weed, the operator directs the nozzle 10 and the shroud 18 towards the weed and depresses the button 20 so as to release water and surfactant from the reservoir 2. The water and surfactant travel down the pipe 8 and hot foam exits from the nozzle 10 in the direction of the weed. If the temperature of the water or the steam pressure in the reservoir 2 drop below the desired levels this is detected by sensors (not shown) and power is provided by the battery 14 to heat the water to the correct temperature and produce steam as required using the immersion heater 12.

It should be noted that the inclusion of a battery in the apparatus shown in the Figures is optional. Further, the valve 6 may be located at the bottom of the reservoir 2 as shown in the Figures but may alternatively be located on the side or at the top of the reservoir 2 in other embodiments.

Figure 4:
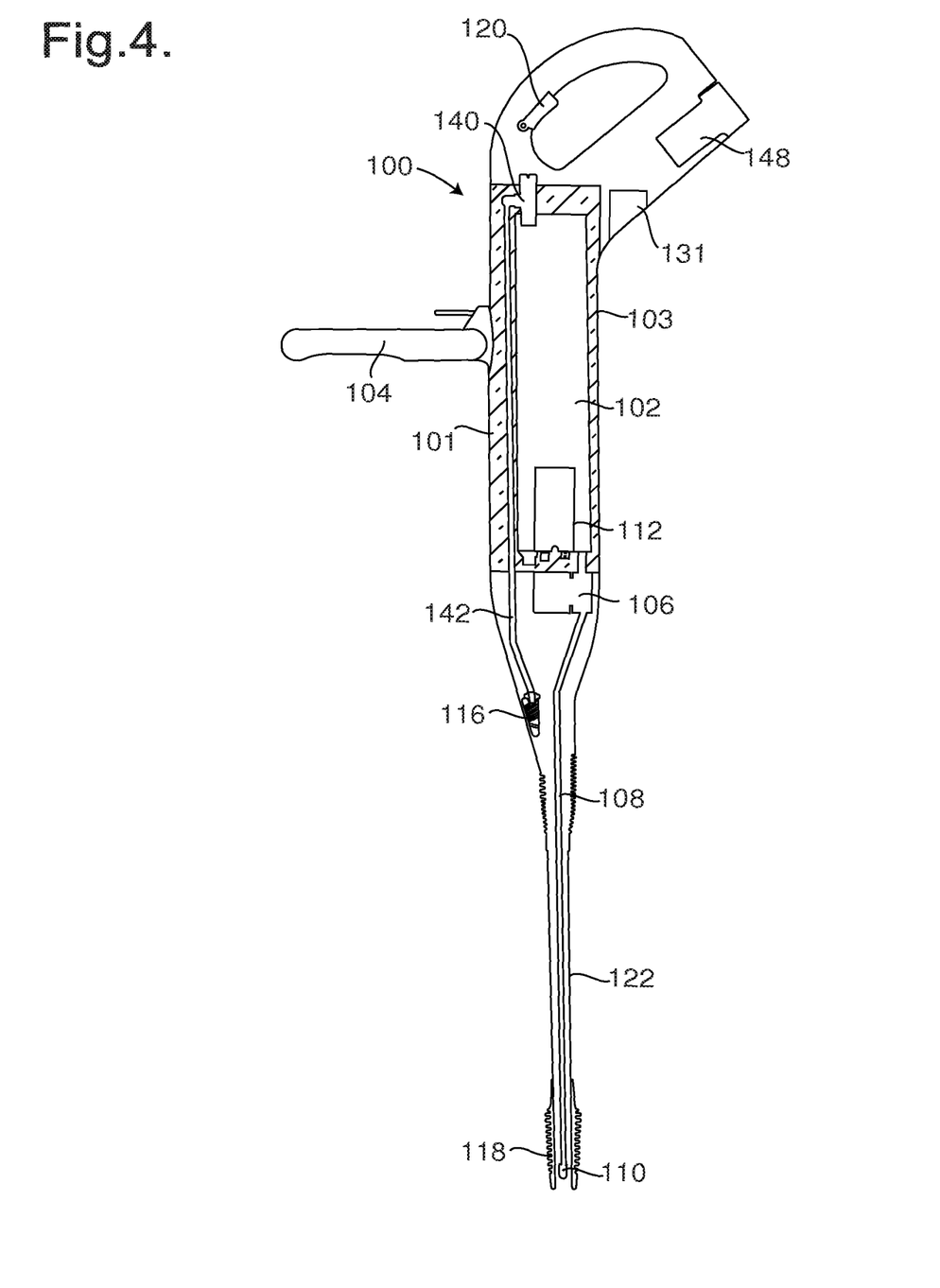
FIG. 4 shows a longitudinal cross-section through a portable apparatus of the present invention.

FIG. 4 shows a longitudinal cross-section through a portable apparatus 100 of the present invention. The apparatus 100 has a reservoir 102 surrounded by thermal insulation 101 and mounted within a casing 103 that is provided with a handle 104. The reservoir 102 has a valve 106 connected by a pipe 108, typically plastic, to a nozzle 110. The reservoir 102 is provided with an immersion heater 112. The reservoir 102 also has a steam over-pressure valve 140 through which steam is vented from the reservoir 102 in the event of a build up of excess pressure. In such an event the steam travels down the pipe 142 and exits through a nozzle 116 within the casing 103. The nozzle 110 is housed within a shroud 118 to direct the foam towards the vegetation. The apparatus 100 also has a button 120 for releasing the valve 106.

As an optional design feature, for ease of transport when not in use, and for cleaning, the projecting part 122 of the casing 103, including the shroud 118, and the enclosed part of the pipe 108, may be disconnectable from the remainder of the apparatus 100.

The apparatus 100 has a battery 148 which provides power to the apparatus when it is not connected to mains power. For example, the battery 148 may provide power to LED indicators (not shown) on the apparatus 100, and to the release valve 106 if this is electrically operated. The apparatus 100 may be connected to mains power by the recessed plug 131.

Figures 5, 7:
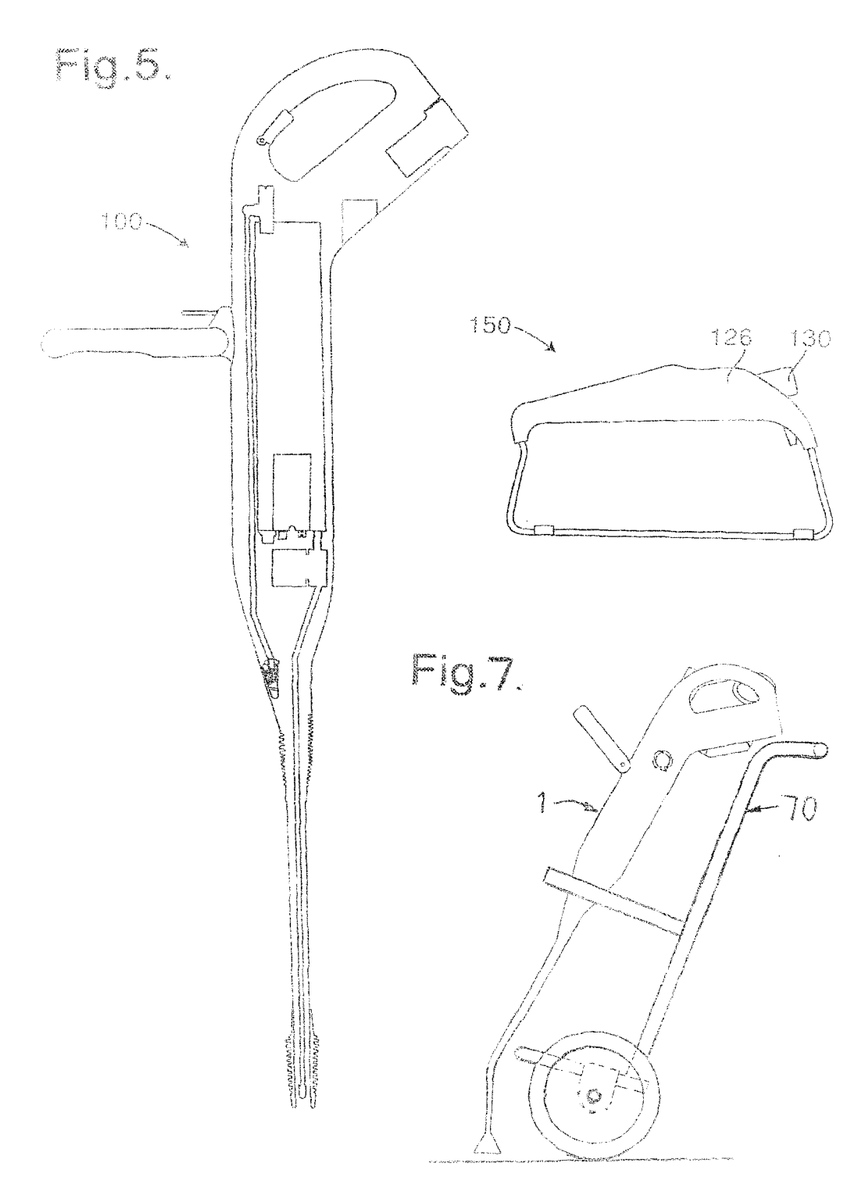
FIG. 5 shows the same longitudinal cross-section as FIG. 4 and in addition shows a side view of a docking station for the portable apparatus of FIG. 4.
FIG. 7 shows a side view of a weeding apparatus as shown in FIG. 1, supporting on a trolley.

FIG. 5 shows the same longitudinal cross-section through the portable apparatus 100 of FIG. 4, although not showing the insulation 101, and in addition shows a side view of a docking station 150 for the portable apparatus 100. The apparatus 100 and docking station 150 are not shown in the same orientation. The docking station 150 is, for example, placed on a bench or table. The docking station 150 has a rest 126 on which the apparatus 100 can rest. The docking station 150 also includes a mains connector 130 which is used to provide power to heat the water in the reservoir 102 of the apparatus 100. The mains connector 130 is typically a raised socket and is typically waterproof.

Figure 6A:
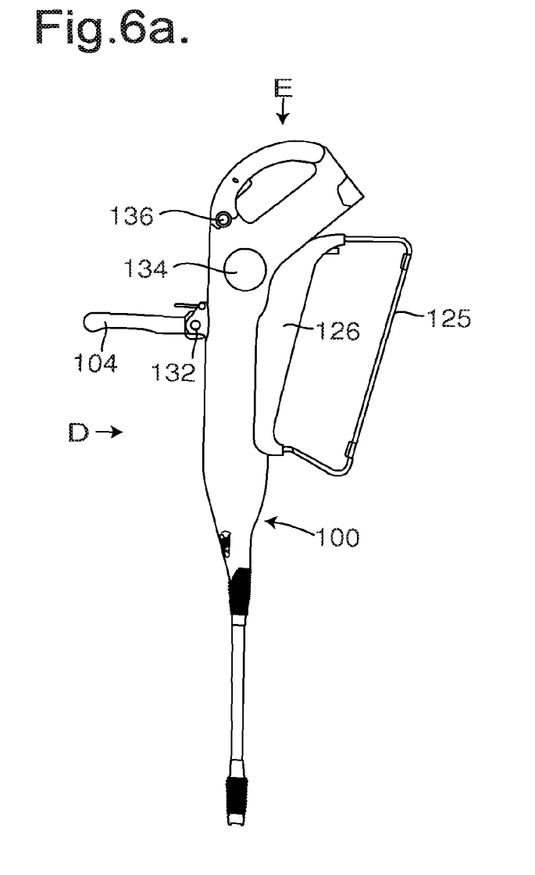
FIG. 6A shows a side view of the apparatus of FIG. 5.
Figure 6B:
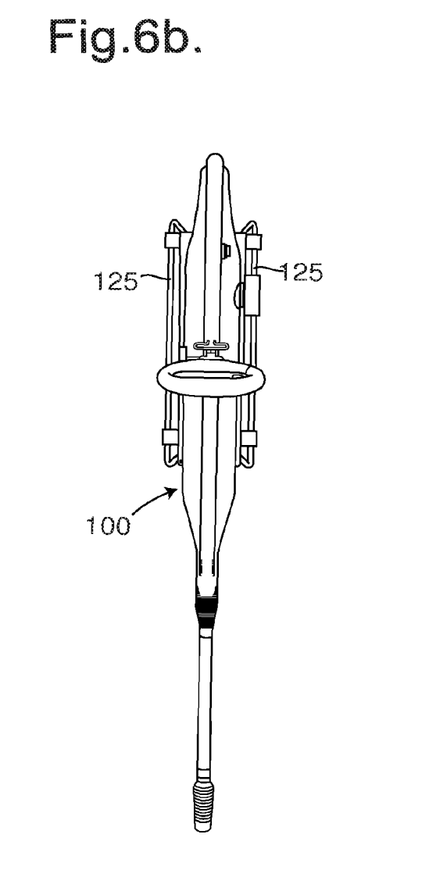
FIG. 6B shows a view in the direction of arrow D of FIG. 6A.
Figure 6C:
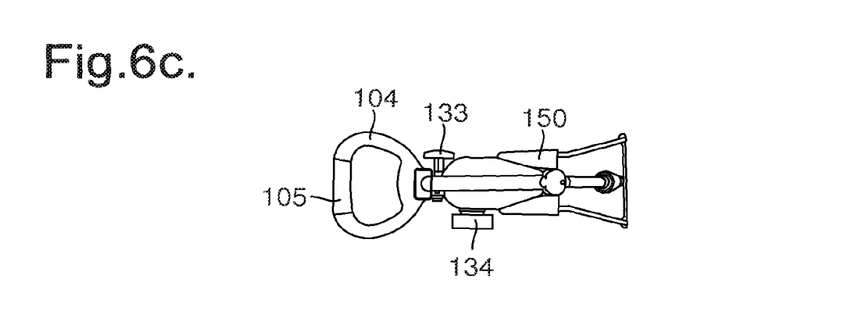
FIG. 6C shows a view in the direction of arrow E of FIG. 6A.

FIGS. 6a, 6b and 6c show three views of the portable apparatus 100 of FIGS. 4 and 5 in position on the docking station 150. FIG. 6a shows a side view of the apparatus 100 from the same direction as FIGS. 4 and 5. In FIG. 6a it can be seen that the handle 104 is adjustable using the pivot 132 by which it is connected to the casing 103. The button 136 is a 'pre-heat' button. Pressing the button 136 provides power to the immersion heater 112 (see FIG. 4) and heats the liquid in the reservoir 102 (see FIG. 4). The apparatus rests on the support 126. The apparatus 100 has a fill opening for the reservoir 102 provided with a cap 134. The cap 134 is preferably a 'fail-safe' cap. For example, the cap 134 may have castellated teeth that are held off by a spring so that that the cap 134 cannot be removed quickly, removal requiring that the cap 134 is repeatedly pushed in and turned. The cap 134 may define ports that deflect any steam away from the operator as the cap 134 is opened. For example, the steam is typically directed into the casing 103. Thus, the cap 134 may require several repeated turning operations to be opened, and during the opening process the pressure in the reservoir 102 is reduced to atmospheric pressure by allowing steam to escape through the cap 134 in a controlled manner.

FIG. 6b shows a view of the apparatus 100 in the direction of arrow D of Figure 6a. The supports 125 of the docking station 150 can be seen either side of the apparatus 100.

FIG. 6c shows a view of the apparatus 100 in the direction of arrow E of Figure 6a. This shows the handle 104, the docking station 150 supporting the apparatus 100, and the cap 134 for the reservoir 102. The handle 104 may have a section 105 which can rotate relative to the remainder of the handle. This enables the user to raise and lower the apparatus 100 more easily without needing to change their hand grip on the handle. The angle of the handle 104 relative to the apparatus can be altered and fixed using the screw 133 which may comprise ratchet teeth.

In use the apparatus 100 is used in substantially the same way as apparatus 1 described above. However, in apparatus 100, the battery does not typically provide power to the immersion heater 112. After heating up on the docking station 150, the temperature of the water in the reservoir 102 is typically maintained in the required temperature range of typically from 96 to 105° C. by the insulation provided around the reservoir 102 for long enough for the operator to empty the reservoir 102 onto weeds.

As mentioned previously, a mobile weed control apparatus may be mounted on a trolly. By way of example FIG. 7 shows a side view of the portable apparatus 1 described above in relation to FIG. 1, supported on a two-wheeled trolley 70.

What is claimed:

1. A mobile apparatus suitable for controlling vegetation which apparatus comprises a reservoir, release means connected to the reservoir, and a nozzle connected to the reservoir through the release means, and a heating means connectable to mains power, wherein the reservoir is suitable for pressure in the reservoir to be above atmospheric pressure, so that in use with the reservoir containing water and a surfactant the heating means is arranged to heat the water until pressure of steam in the reservoir reaches a desired level above atmospheric pressure, the apparatus also including a battery, wherein the reservoir comprises a further heating element, and the battery is connectable to the further heating element; and when the release means is opened the steam pressure within the reservoir forces the water and surfactant out of the nozzle to produce a stream of hot foam comprising steam.

2. An apparatus according to claim 1 wherein the reservoir is surrounded by thermal insulation.

3. An apparatus according to claim 1 wherein the reservoir has a volume of from 0.2 to 1.5 liters.

4. An apparatus according to claim 1 wherein the reservoir has a volume of up to 100 liters and the apparatus is mounted on a wheeled trolley.

5. An apparatus according to claim 1 which further comprises a docking station, which docking station provides means for connecting mains power to the apparatus to heat the liquid in the reservoir.

6. An apparatus as claimed in claim 1 wherein the desired elevated pressure is between 120 kPa (18 psi) and 202 kPa (30 psi).

7. An apparatus as claimed in claim 6 wherein the desired elevated pressure is between 120 kPa (18 psi) and 135 kPa (20 psi).

8. A mobile apparatus suitable for controlling vegetation which apparatus comprises a reservoir, release means connected to the reservoir, and a nozzle connected to the reservoir through the release means, and a heating means connectable to mains power, wherein the reservoir is suitable for pressure in the reservoir to be above atmospheric pressure, so that with the reservoir containing water and a surfactant the heating means is arranged to heat the water until pressure of steam in the reservoir reaches a desired level above atmospheric pressure, the apparatus also including a battery, and the release means being powered by the battery and configured such that the release means can only be released when mains power is disconnected; and when the release means is opened the steam pressure within the reservoir forces the water and surfactant out of the nozzle to produce a stream of hot foam comprising steam.

9. An apparatus according to claim 8 wherein the reservoir comprises a further heating element, and the battery is connectable to the further heating element.

10. An apparatus according to claim 8 wherein the reservoir has a volume of from 0.2 to 1.5 liters.

11. An apparatus according to claim 8 wherein the reservoir has a volume of up to 100 liters and the apparatus is mounted on a wheeled trolley.

12. An apparatus according to claim 8 which further comprises a docking station, which docking station provides means for connecting mains power to the apparatus to heat the liquid in the reservoir.

13. An apparatus as claimed in claim 8 wherein the desired elevated pressure is between 120 kPa (18 psi) and 202 kPa (30 psi).

14. An apparatus as claimed in claim 13 wherein the desired elevated pressure is between 120 kPa (18 psi) and 135 kPa (20 psi).

15. A method of controlling vegetation which method comprises providing an apparatus as claimed in claim 1, preparing a mixture comprising a foaming agent, water and steam in the reservoir, forming hot foam that contains steam from the mixture, and directing the hot foam onto vegetation wherein, the steam pressure in the apparatus remains above atmospheric pressure while the foam is used.

16. A method according to claim 15 wherein the method comprises initially heating a liquid comprising water and a foaming agent to a temperature of from 96° C. to 105° C.

17. A method according to claim 16 wherein the method comprises heating the liquid by mains power, and then disconnecting the mains power before directing the foam onto vegetation.

18. A method according to claim 17 wherein the liquid is maintained at 96° C. to 105° C. in a thermally insulated reservoir.

19. A method according to claim 17 wherein liquid is maintained at 96° C. to 105° C. using the battery powered heating element while the foam is directed onto the vegetation.

20. A method of controlling vegetation which method comprises providing an apparatus as claimed in claim 8, preparing a mixture comprising a foaming agent, water and steam in a reservoir, forming hot foam that contains steam from the mixture, and directing the hot foam onto vegetation wherein the steam pressure in the apparatus remains above atmospheric pressure while the foam is directed, wherein the foam is released by the battery powered release means which is configured such that the release means can only be used to release the foam when mains power is disconnected.

21. A method comprising controlling pests with the mobile apparatus of claim 1.

* * * * *